(12) United States Patent
Imura

(10) Patent No.: US 6,513,719 B1
(45) Date of Patent: Feb. 4, 2003

(54) CARD-SHAPED SEMICONDUCTOR STORAGE DEVICE AND OPERATION SETTING METHOD OF THE SAME

(75) Inventor: Shigeru Imura, Tokyo (JP)

(73) Assignee: Sony Corporation, Tokyo (JP)

( * ) Notice: Subject to any disclaimer, the term of this patent is extended or adjusted under 35 U.S.C. 154(b) by 222 days.

(21) Appl. No.: 09/631,554

(22) Filed: Aug. 3, 2000

(30) Foreign Application Priority Data

Aug. 5, 1999 (JP) .............................................. 11-222351

(51) Int. Cl.$^7$ ................................................ G06K 19/06
(52) U.S. Cl. ........................................ 235/492; 235/436
(58) Field of Search .................................. 235/492, 436

(56) References Cited

U.S. PATENT DOCUMENTS

| | | | |
|---|---|---|---|
| 4,672,182 A | | 6/1987 | Hirokawa |
| 4,992,651 A | * | 2/1991 | Takaitiri ..................... 235/492 |
| 5,623,546 A | | 4/1997 | Hardy et al. |
| 5,737,421 A | | 4/1998 | Audebert |
| 5,778,071 A | | 7/1998 | Caputo et al. |
| 5,887,065 A | | 3/1999 | Audebert |

FOREIGN PATENT DOCUMENTS

| | | |
|---|---|---|
| EP | 0821326 | 1/1998 |
| WO | 9736263 | 10/1997 |

* cited by examiner

Primary Examiner—Harold I. Pitts
(74) Attorney, Agent, or Firm—Jay H. Maioli

(57) ABSTRACT

A CPU and an enciphering circuit are provided in a memory card with a construction of a memory stick. Data which is inputted and outputted is enciphered and stored in a flash memory. A command system for accessing the memory stick has a public command system and a non-public command system for management. In file data which is stored in the flash memory, an access restriction, copy guard information, and encipherment and a personal identification number at the time of access can be selectively set for every file data. In those file data, a data file including hidden file data manages processes. An access right is set into the file data and accesses for reading and writing the file data are restricted in accordance with the access right. Since the data is enciphered and stored in the flash memory, the security of the data to be stored is enhanced.

38 Claims, 13 Drawing Sheets

Fig. 7A

DIRECTORY DESCRIPTION
COMMON SPECIFICATIONS

| BYTE(S) | DESCRIPTION | LENGTH |
|---|---|---|
| 1-4 | RESIDUAL NON-USE MEMORY CAPACITY | 4 |
| 5-20 | DIRECTORY ID + TAG | 16 |
| 21 | DIRECTORY TYPE | 1 |
| 22-27 | TIME STAMP (yyyy,MM,dd,hh,mm) OPTION | 6 |
| 28-29 | RFU | 2 |
| 30 | LENGTH OF SUBSEQUENT FILE DATA FOR APPLICATION | 1 |

Fig. 7B

SPECIFICATION FOR EACH APPLICATION

| BYTE(S) | DESCRIPTION | LENGTH |
|---|---|---|
| 31 | DIRECTORY CHARACTERISTICS | 1 |
| 32-33 | THE NUMBER OF SUB-DIRECTORIES | 2 |
| 34-35 | THE NUMBER OF FILES UNDER CURRENT DIRECTORY | 2 |
| 36 | THE NUMBER OF PIN, UNBLOCKING PIN, AND ADMINISTRATIVE CODES | 1 |
| 37 | RFU | 1 |
| 38 | PIN 1 STATUS | 1 |
| 39 | UNBLOCKING PIN 1 STATUS | 1 |
| 40 | PIN 2 STATUS | 1 |
| 41 | UNBLOCKING PIN 2 STATUS | 1 |
| 42-48 | ADMINISTRATIVE MANAGEMENT USE | 7 |

Fig. 7C

DIRECTORY TYPE CODING (EXAMPLE)
00:RFU
01:DIRECTORY
02:SUB-DIRECTORY
04:DATA FILE

Fig. 7D

DIRECTORY CHARACTERISTICS (EXAMPLE)
BIT 1:CLOCK STOP MODE
BIT 2:RFU
BIT 3-4:CLOCK STOP MODE
BIT 5-7:RFU
BIT 8:PIN1 VALID/INVALID

Fig. 7E

SECURITY STATUS (EXAMPLE)
BIT1-4:PIN MISINPUT COUNTER
         0 INDICATES "BLOCKED"
BIT 5-7:RFU
BIT 8:INITIALIZATION INFORMATION

Fig. 8A

FILE DESCRIPTION
COMMON SPECIFICATIONS

| BYTE(S) | DESCRIPTION | LENGTH |
|---|---|---|
| 1-4 | FILE SIZE | 4 |
| 5-20 | FILE ID + TAG | 16 |
| 21 | FILE TYPE | 1 |
| 22-27 | TIME STAMP (yyyy,MM,dd,hh,mm) OPTION | 6 |
| 28 | MODE | 1 |
| 29-32 | ACCESS CONDITIONS | 4 |
| 33 | FILE STATUS | 1 |
| 34 | LENGTH OF SUBSEQUENT FILE DATA FOR APPLICATION | 1 |

Fig. 8B

SPECIFICATIONS FOR EACH APPLICATION

| BYTE(S) | DESCRIPTION | LENGTH |
|---|---|---|
| 35 | STRUCTURE OF DATA FILE | 1 |
| 36-37 | LENGTH OF RECORD | 2 |

Fig. 8C

FILE TYPE CODING (EXAMPLE)
00:RFU
01:DIRECTORY
02:SUB-DIRECTORY
04:DATA FILE

Fig. 8D

MODE (EXAMPLE)
INCREASE COMMAND
ENABLE/DISABLE FOR CYCLIC FILE

Fig. 8E

MODE (EXAMPLE)
BIT 1-7:RFU
BIT 8:INCREMENT COMMAND
    ALLOWED OR NOT

Fig. 8F

ACCESS CONDITION CODE (EXAMPLE)
0:ALW (AYS)
1:PIN 1
2:PIN 2
3:RFU
4:ADM (INISTARATIVE)
:
E:ADM
F:NEV (ER)

BYTE 29 (EXAMPLE)
BIT 1-4:UPDATE
BIT 5-8:READ;SEEK

BYTE 30 (EXAMPLE)
BIT 1-4:RFU
BIT 5-8:INCREASE

BYTE 31 (EXAMPLE)
BIT 1-4:INVALIDATE
BIT 5-8:REHABILITATE

BYTE 32 (EXAMPLE)
BIT 1-4:SCRAMBLE
BIT 5-8:COPY

Fig. 8G

FILE STATUS (EXAMPLE)
BIT 1:INVALIDATED OR NOT
BIT 2:SCRAMBLED OR NOT
BIT 3-8:RFU

FILE STRUCTURE (EXAMPLE)
00:TRANSPARENT
01:LINEAR FIXED
03:CYCLIC

CARD-SHAPED SEMICONDUCTOR STORAGE DEVICE AND OPERATION SETTING METHOD OF THE SAME

BACKGROUND OF THE INVENTION

1. Field of the Invention

The invention, particularly, relates to a card-shaped semiconductor storage device which is suitable when it is used to store data of contents that is distributed through a network and to an operation setting method of such a card-shaped semiconductor storage device.

2. Description of the Related Art

A service to distribute music data by using the Internet has been started. In such a service, a site for distributing the music data is provided on the Internet. When the user selects a desired music piece by accessing the site, the selected music data is transmitted via the Internet and downloaded to a recording medium.

A service to distribute music by using a digital satellite broadcasting has been also proposed. In such a service, the music data for downloading and data of a script language such as MHEG (Multimedia and Hypermedia Information Coding Experts Group), XML (extensible Markup Language), or the like for forming a picture plane for downloading are transmitted as additional data by a music channel together with video data and audio data for providing a music program. The picture plane for downloading is formed by the data of the script language. When an instruction is given by the picture plane, the music data transmitted for downloading is downloaded to the recording medium.

Further, a service to distribute music by using a cellular phone has been proposed. According to such a service, when a line is connected to a predetermined dial number by the cellular phone, the user can receive the distribution of music data. When the user operates the cellular phone, desired music data is transmitted via a network of the cellular phone and downloaded to a recording medium loaded in the cellular phone.

The services to provide the contents such as music data, printed matter, game software, and the like by using various transmitting media such as Internet, digital satellite broadcasting, cellular phone line, and the like as mentioned above are taken into consideration. In such services, the transmitted data is downloaded to the recording medium.

As a recording medium for downloading the data of the contents as mentioned above, it is possible to use a magnetic disk such as floppy disk, hard disk, or the like or an optical disk or magneto-optical disk such as CD-R (CD-Recordable) or MO (Magneto-Optical). However, such a disk-shaped recording medium has a problem on vibration proof since it includes a mechanical portion, it becomes large in size, and it is difficult to carry outside or to easily use it.

To solve such problems, it has been proposed to use a memory card called memory stick as a recording medium for downloading the data of such contents.

The memory stick is a card-shaped nonvolatile semiconductor memory using an NAND type flash memory. The memory stick has an access speed of about 20 MB/sec by using a serial half duplex sync data transfer system instead of a parallel interface using a PCMCIA (Personal Computer Memory Card International Association) interface which has conventionally been widely used. In the memory stick, a high speed access is possible and a memory capacity of up to about 64 MB has been scheduled. The capacity of 64 MB of the memory stick is larger than a memory capacity (1.4 MB) of the existing floppy disk and is regarded to be a capacity large enough to record the data of the contents. Although such a capacity is smaller than a memory capacity (128 MB to 640 MB) of an MD (Mini Disc) or CD-R, the MD or CD-R is large in size because it includes the mechanism portion and is difficult to be easily handled. On the other hand, the memory stick is small, can be easily handled, and is excellent in vibration proof.

For example, in case of downloading music data, such a situation that the user reproduces the downloaded music data by a portable headphone stereophonic apparatus or a car audio apparatus is considered. According to such a using method, the small memory stick having excellent vibration proof is regarded to be a very useful recording medium.

However, in the memory stick, it is a present situation that a CPU is not built in and a security function is incomplete. In case of downloading music data, it is necessary to enhance the security for the purpose of protection of the copyright. Particularly, when the data of those contents is obtained by using the network, there is a method of charging by using electronic money. In the memory stick, since no CPU is built in, such a charging process is difficult.

An IC card has been known as a card in which a CPU has been built. For example, in a cellular phone of a GSM (Group System for Mobile Communications) system in Europe, an IC card called SIM which conforms with ISO7816 is used. Such an IC card is used for storing an authentication, contents of a contract, enciphering algorithm, abbreviated dial numbers, and the like by a cellular phone of the GSM system. An IC card in which a CPU has been built is used in the field of electronic money such as pay television or mondex system. Such an IC card has a high secrecy against a copy and a forgery as compared with that of a memory card.

However, since memory capacities are small and access speeds are low in those IC cards, it is difficult to use them for an application for storing the downloaded contents.

OBJECTS AND SUMMARY OF THE INVENTION

It is, therefore, an object of the invention to provide a card-shaped semiconductor storage device in which the security can be enhanced and a compatibility with an existing memory card can be realized and to provide an operation setting method of such a card-shaped semiconductor storage device.

According to a preferred aspect of the invention, there is provided a card-shaped semiconductor storage device having a construction of a memory card, comprising: a nonvolatile semiconductor memory; data input/output control means for performing an input/output control of data to/from the nonvolatile semiconductor memory; and interface means with an external apparatus, wherein the storage device further has enciphering means for enciphering the data to be stored in the nonvolatile semiconductor memory and control means for controlling the encipherment.

According to another aspect of the invention, there is provided an operation setting method of a card-shaped semiconductor storage device having a construction of a memory card comprising: a nonvolatile semiconductor memory; data input/output control means for performing an input/output control of data to/from the nonvolatile semiconductor memory; and interface means with an external apparatus, wherein the data is enciphered and the enciphered data is stored in the nonvolatile semiconductor memory.

A CPU and an enciphering circuit are provided for the memory card with a construction of a memory stick. The data which is inputted or outputted is enciphered and stored in a flash memory. As command systems for accessing the memory stick, a public command system and a non-public command system are provided. As for file data which is stored in the flash memory, an access limitation, copy guard information, and an encipherment and a personal identification number at the time of access can be selectively set every file data. Processes of those file data are managed by a data file including a hidden data file. An access right is set into the file data and accesses for reading and writing the file data are limited in accordance with the access right. Since the data is enciphered and stored in the flash memory as mentioned above, a security of the stored data is enhanced.

The above and other objects and features of the present invention will become apparent from the following detailed description and the appended claims with reference to the accompanying drawings.

BRIEF DESCRIPTION OF THE DRAWINGS

FIGS. 7A to 7E are schematic diagrams for use in explanation of a directory in the example of the memory card to which the invention is applied;

FIGS. 8A to 8G are schematic diagrams for use in explanation of a file in the example of the memory card to which the invention is applied;

DETAILED DESCRIPTION OF THE PREFERRED EMBODIMENTS

An embodiment of the invention will now be described in the following order.
1. Internal construction of an SIM
2. Internal construction of a memory stick
3. Example of a smart stick
   3-1. Construction of an example of the smart stick
   3-2. Session of an external apparatus and the smart stick
   3-3. About encipherment
   3-4. About a file construction
   3-5. About an access process
4. Another example of an intelligent memory stick

1. Internal Construction of an SIM

According to the invention, by adding a function of an IC card called SIM to a memory card called a memory stick, the security can be enhanced and a compatibility with the existing memory stick can be realized. Prior to explaining the invention, the IC card called SIM (Subscriber Identity Module)and the memory card called a memory stick will be described.

The IC card called SIM is an IC card which conforms with ISO (International Organization for Standardization) 7816 and has a built-in CPU. This IC card is used for authenticating by a personal identification number of the subscriber and storing a contract contents enciphering algorithm, an abbreviation dial number, and the like by a cellular phone of a GSM (Group Special Mobile) system.

Figure 1:
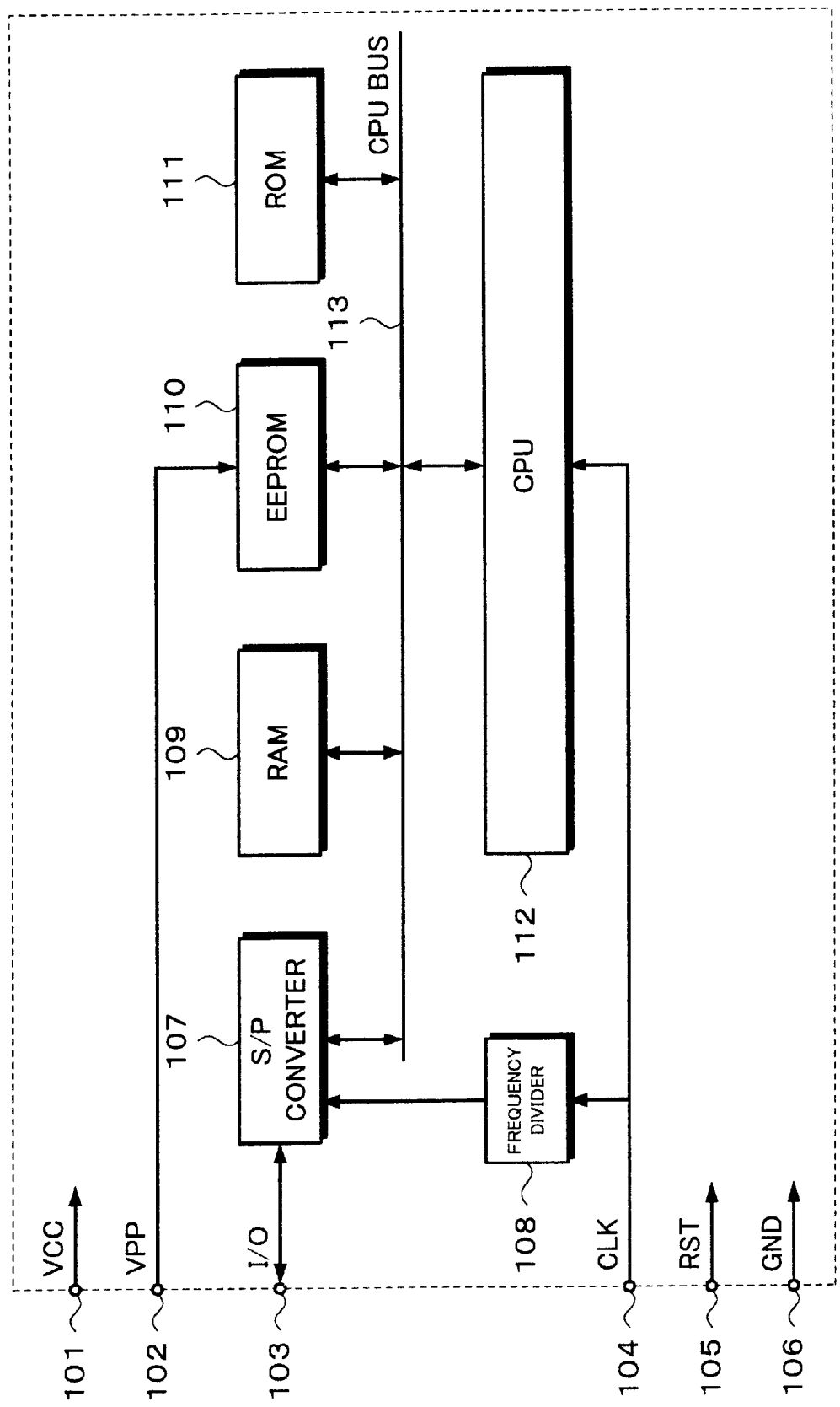
FIG. 1 is a block diagram for use in explanation of an SIM.

FIG. 1 is a block diagram showing an internal construction of an IC card called SIM. As connecting terminals for connecting the IC card to an external apparatus, a power terminal 101, a power terminal 102 for a program, an input/output terminal 103 of bidirectional data, a clock input terminal 104, a reset input terminal 105, and a ground terminal 106 are provided for the IC card.

The power terminal 101 is used to supply an operating power source Vcc from the outside. A voltage of the operating power source Vcc is set to 5V or 3V.

The program power terminal 102 is used for supplying a power source Vpp for a program to a built-in EEPROM (Electrically Erasable and Programmable ROM) 110. The EEPROM 110 is a nonvolatile memory which can be electrically erased. A voltage of the program power source Vpp which is applied to the EEPROM 110 is generally set to a value similar to the power voltage Vcc. There is also a device in which the program power source Vpp is generated in the SIM. Although a structure in which the program power source Vpp is supplied from the outside is shown here, its supplying method is not essential.

The input/output terminal 103 of bidirectional data is a data I/O terminal for actually inputting and outputting data via a bidirectional data signal line I/O. The data is inputted and outputted to/from the bidirectional data signal line I/O through a serial/parallel converter 107. When no data is inputted or outputted, the bidirectional data signal line I/O is maintained to almost the same voltage as the operating power voltage Vcc, and an external control apparatus and the SIM are in a state where they can mutually receive the data.

A clock CLK is supplied to the clock input terminal 104. The clock CLK is a clock for making a CPU (Central Processing Unit) 112 built in the SIM operative. The clock CLK is properly frequency divided by a frequency divider 108 and supplied to the serial/parallel converter 107. The clock CLK which was frequency divided by the frequency divider 108 becomes a transfer clock for deciding a transfer speed of the data which is exchanged by the bidirectional data signal line I/O.

A reset signal RST is supplied to the reset input terminal 105. The reset signal RST is used for initializing not only for the built-in CPU 112 but also the frequency divider 108, serial/parallel converter 107, and the like.

The input/output of the data is performed by the serial/parallel converter 107 through the bidirectional data signal line I/O. The serial/parallel converter 107 converts data transmitted as serial data from the external apparatus into parallel data of, for example, 8 bits.

The serial data which is inputted and outputted through the bidirectional data signal line I/O has such a structure that a start bit at the "L" level exists at the head, bit data having a positive logic of the LSB-first (or a negative logic of the MSB-first; either the positive logic or the negative logic is selected by a manufacturer of the IC card) continues after that, and one bit of an even parity is finally added. The head of the data is detected by the start bit at the "L" level and the data is subsequently sent. An error is detected by the parity. At this time, if the error is detected by the parity, a signal at the "L" level is sent from the reception side at a specific time between two clocks subsequent to a parity bit. The transmission side, consequently, can recognize the occurrence of the error. When the occurrence of the error is detected, the transmission side transmits the same data again.

This method is a half duplex asynchronous communication protocol of ISO7816. The serial/parallel converter 107 performs a converting process between the serial data and the parallel data through those processes.

An RAM (Random Access Memory) 109 is a memory to/from which data can be written and read out anytime. The RAM 109 is used for temporarily storing data which is necessary when the CPU (Central Processing Unit) 112 executes processes or temporarily storing several data.

The EEPROM 110 stores data which is used only therein, data which is continuously used while being updated upon using, and the like. For example, in a digital cellular phone, abbreviation dials, contents of a contract, short message, control data for starting and keeping communication, or the like is stored in the EEPROM 110.

Although the EEPROM is used here, for example, a flash memory can be also used in place of the EEPROM.

A program to be processed by the CPU 112 is mainly stored in an ROM (Read Only Memory) 111. Processing commands comprise, for example: a public command system which is necessary for manufacturing and using the cellular phones; a non-public command system for management for the purpose of security, for example, for operating a scramble key generating unit, data which cannot be used by persons other than an issuer or an administrator, or the like; and a personal identification number. As mentioned above, by preparing the non-public command system for management, the security function of the SIM is further enhanced.

The frequency divider 108 is used to obtain a clock for transmitting data by using a predetermined transmitting route such as a bidirectional data signal line I/O from the clock CLK for making the CPU 112 operative. For example, in a cellular phone system of the GSM system, 1/372 is used as a frequency division ratio of the frequency divider 108. The frequency division ratio can be also changed in accordance with a use object or a use situation.

The CPU 112 performs processes in the SIM in accordance with commands from the outside. In this instance, whether the access right exists therein or not or the like is discriminated and the processes are executed.

A bus 113 for data is used to transfer data when a command is read out from the ROM 111 in the case where the CPU 112 executes the command, when data is read out or written from/into the RAM 109 anytime in order to temporarily store the data therein, or when the EEPROM 110 is accessed on the basis of a request from the external apparatus.

As mentioned above, in the IC card with the construction of the SIM, the data which is used only in the IC card, namely, the data such as abbreviation dials, contents of a contract, short message, control data for starting and keeping communication, or the like, the data which is continuously used while being updated upon using, and the like are stored in the EEPROM 110. For example, processing commands comprising the public command system which is necessary for manufacturing or using the cellular phones and the non-public command system for management for the purpose of security, for example, for operating the scramble key generating unit, data which cannot be used by persons other than an issuer or an administrator, or the like are stored in the ROM 111. Data which is inputted and outputted is managed by the CPU 112. Therefore, an excellent security function is guaranteed.

2. Internal Construction of a Memory Stick

Figure 2:
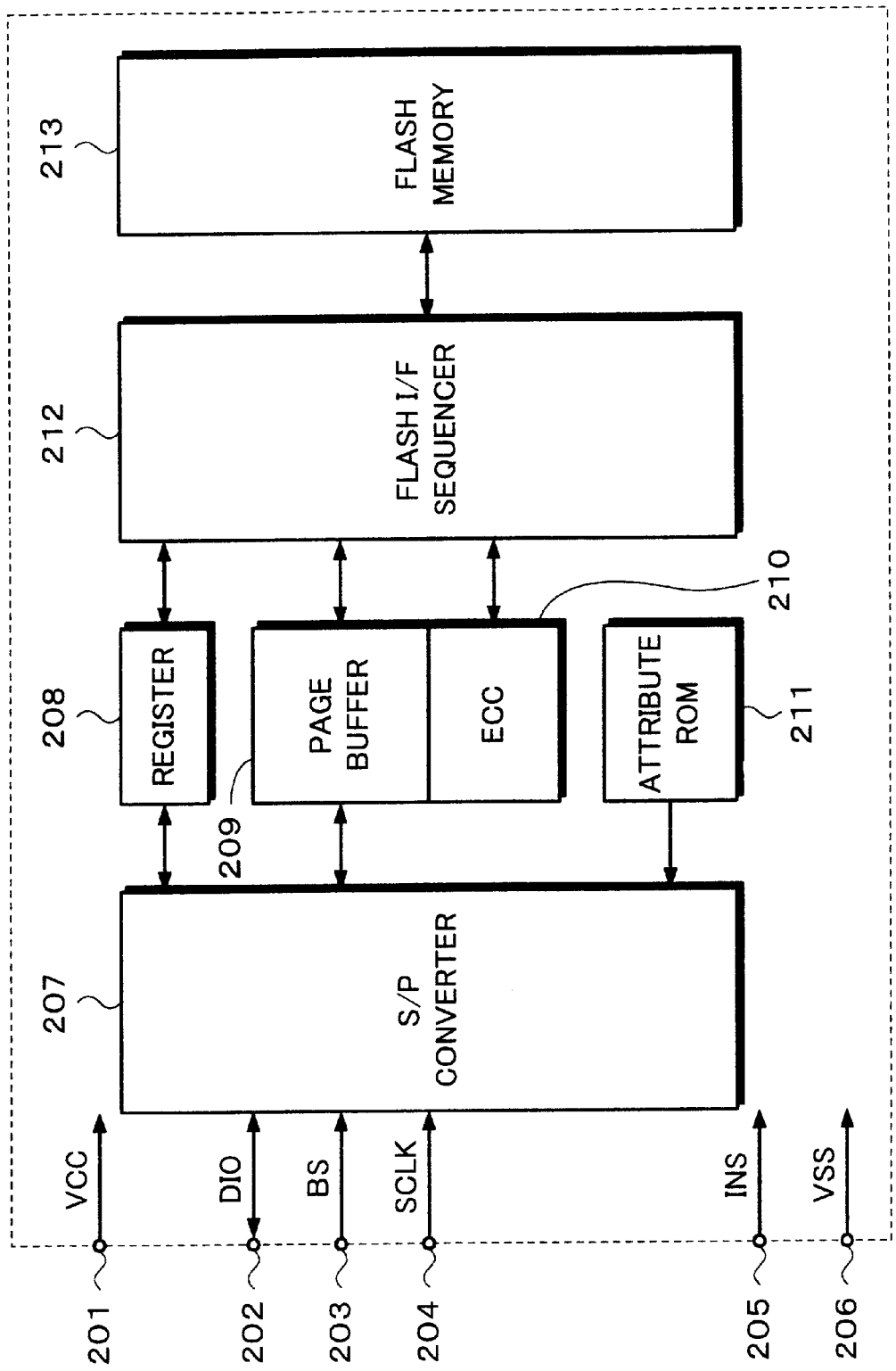
FIG. 2 is a block diagram for use in explanation of a memory stick.

The memory card called a memory stick will now be described. FIG. 2 is a block diagram showing an internal structure of the memory stick.

The memory stick comprises: a power terminal 201; a data input/output terminal 202 for connecting the memory stick to an external apparatus; an input terminal 203 of a bus state; an input terminal 204 of a serial clock; a detection terminal 205 for detecting the insertion or removal of the memory stick; and a ground terminal 206.

Data is inputted and outputted by the data input/output terminal 202 through a bidirectional data signal line DIO. The data signal line DIO is used for writing or reading out control data called a transfer protocol command (TPC) or the data itself.

A bus state BS is supplied to the input terminal 203 of the bus state. The bus state BS indicates a status for the data on the bidirectional data signal line DIO. For example, the processes of the memory stick are executed by changing the state by the TPC or the data itself before performing the data access.

A transfer clock SCLK is supplied to the serial clock terminal 204. The transfer clock SCLK is generated when the TPC or the data itself is transferred. The transfer clock SCLK is controlled by the bus state BS.

The detection terminal 205 is used when the external apparatus detects an inserting/removal state of the memory stick. In the memory stick, the detection terminal 205 is connected to the ground and connected to a power source through a pull-up resistor by the external apparatus. Therefore, the detection terminal 205 is set to the "L" level in a state where the memory stick has been inserted and to the "H" level when it is removed.

The ground terminal 206 is connected to a ground Vss.

Upon writing, a serial/parallel converter 207 converts the serial data transmitted via the bidirectional data signal line DIO synchronously with the transfer clock SCLK into parallel data of 8 bits. The control command and the data are also converted from the serial data into the parallel data.

Upon reading, the parallel data of 8 bits or the like stored in a flash memory 213 in the memory stick is converted into the serial data by the serial/parallel converter 207 and outputted to the external apparatus via the bidirectional data signal line DIO.

A register 208 comprises a status register, a parameter register, an extra data register, and the like and controls an access to a memory in the memory stick by the TPC.

A page buffer 209 is used for temporarily storing data when the data is exchanged between the serial/parallel converter 207 and flash memory 213.

An error detection code generating unit 210 adds an error detection code such as a CRC (Cyclic Redundancy Check) code or the like to the data to be transmitted or the data which is inputted and detects an error of the data to be transmitted or the data which is inputted. The reliability of the data is assured by performing such an error detection.

An attribute ROM 211 stores physical information in the memory stick. The information in the attribute ROM 211 is read out just after the power source was turned on. The external apparatus is used for checking a correspondence situation of this information.

A flash I/F sequencer 212 controls the data between the page buffer 209 and flash memory 213 on the basis of parameters or the like set in the register 208.

A nonvolatile memory card comprising, for example, NAND type memory cells is used as a flash memory 213. The flash memory is partitioned on a page unit basis of a certain capacity and data is written and read out. Although there are a variety of memory capacities of the flash memory 213, a memory capacity of up to about 64 MB, for example, has been scheduled.

As mentioned above, in the memory stick., data of up to about 64 MB, for example, can be stored by the flash memory 213. In the memory stick, an access speed of about 20 Mb/sec can be guaranteed by using the serial half duplex sync data transfer system.

3. Example of a Smart Stick 3-1. Construction of an Example of the Smart Stick

According to the invention, the memory card with the construction of the memory stick shown in FIG. 2 is used as a basic construction and the compatibility with the IC card called SIM shown in FIG. 1 is enabled to be maintained on each signal line base, thereby realizing an intelligent memory stick. The intelligent memory stick realized as mentioned above can be used as an ordinary memory stick and a function similar to that of the IC card called SIM can be used. Therefore, when the data of the contents is downloaded, the security is improved and a charging process can be performed by electronic money or the like. The intelligent memory stick realized as mentioned above is called a smart stick hereinbelow.

Figure 3:
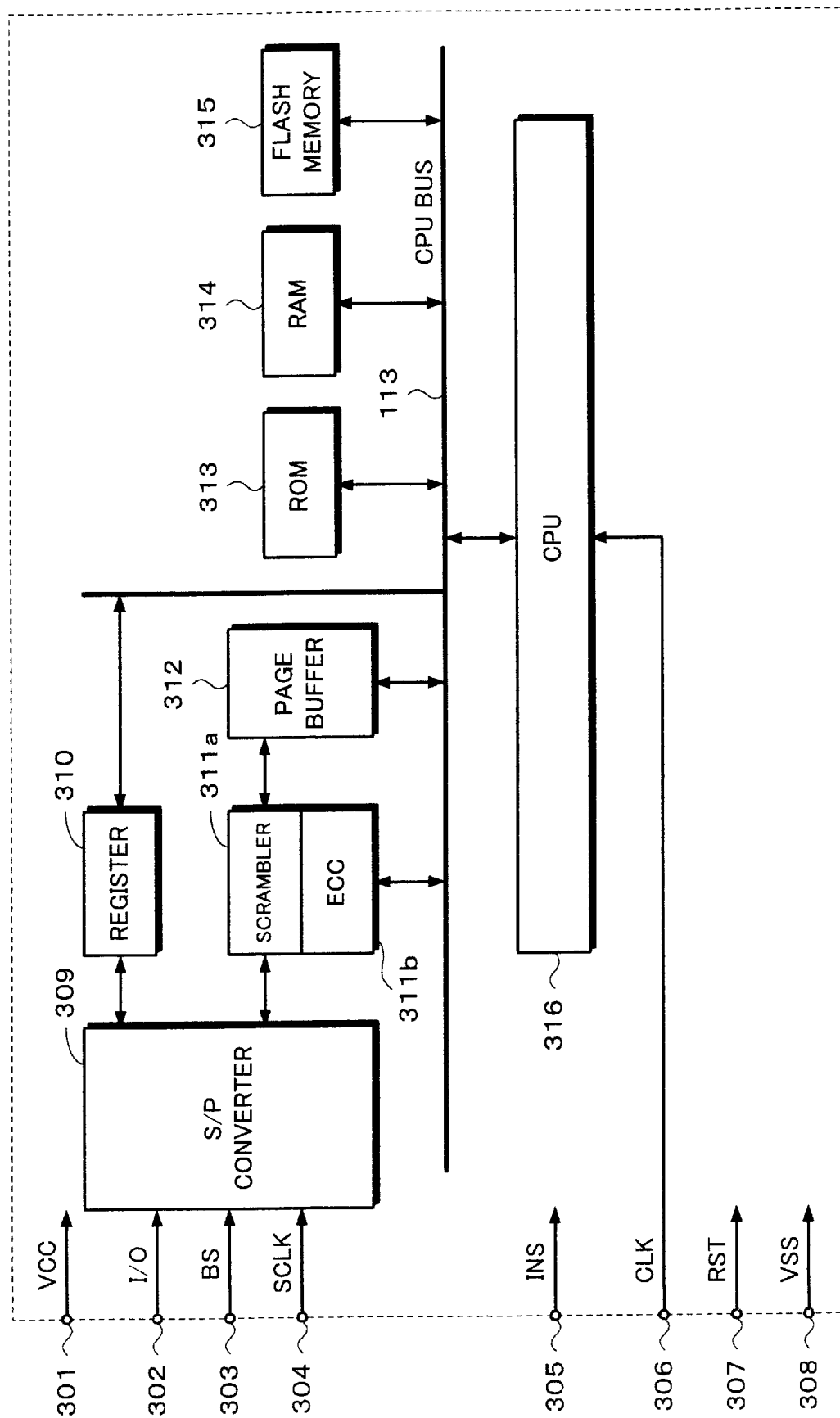
FIG. 3 is a block diagram of an example of a memory card to which the invention is applied.

FIG. 3 shows an example of an internal structure of the smart stick to which the invention is applied. As shown in FIG. 3, a power terminal 301, an input/output terminal 302 of the bidirectional data signal line I/O, an input terminal 303 of a bus state, a transfer clock input terminal 304, a detection terminal 306 for detecting the insertion or removal of the smart stick, a clock input terminal 306, a reset input terminal 307, and a ground terminal 308 are provided for the smart stick.

The power terminal 301 is used for supplying the operating power source Vcc from the outside. A voltage of the operating power source Vcc is set to a value within a range from 3V to 5V.

The input terminal 302 is a data input/output terminal for actually inputting and outputting the data via the bidirectional data signal line I/O. The bidirectional data signal line I/O is similar to the bidirectional data signal line (FIG. 1) of the SIM or the bidirectional data signal line DIO (FIG. 2) of the memory stick.

The bus state BS is supplied to the input terminal 303 of the bus state. The bus state BS indicates a status for the data at the time when it is transferred on the bidirectional data signal line by packet communication. For example, the processes of the memory stick are executed by changing the state by the TPC or data itself before performing the data access. An asynchronous mode in which the bus state BS is not used is also possible for the data input/output. This system is the half duplex asynchronous communication protocol of ISO7816 used in the SIM.

The serial clock SCLK for transfer is supplied to the transfer clock input terminal 304. As for the transfer clock SCLK, the clock generation is controlled by the bus state BS in a state of the packet communication. The transfer clock SCLK is not used in the half duplex asynchronous communication protocol.

The detection terminal 305 is used when the external apparatus detects an insertion/removal state of the smart stick. In the smart stick, the detection terminal 305 is connected to the ground and connected to a power source through a pull-up resistor by the external apparatus. Therefore, the detection terminal 305 is set to the "L" level in a state where the smart stick has been inserted and to the "H" level when it is removed.

The operating clock CLK is supplied to the clock input terminal 306. The operating clock is supplied to a CPU 316 so as to make it operative.

The reset signal RST is supplied to the reset input terminal 307. The built-in CPU 316 is initialized by the reset signal RST, and a serial/parallel converter 309, a register 310 for control, a scrambler 311a, and the like are also initialized.

The ground terminal 308 is connected to the ground Vss.

The serial/parallel converter 309 performs a conversion between serial data and parallel data so that data can be exchanged with the external apparatus. The serial data is transferred between the converter 309 and the external apparatus via the bidirectional data signal line I/O and processes are executed in the converter by parallel data of 8 bits. The serial/parallel converter 309 performs the converting process between the serial data and the parallel data of 8 bits.

The register 310 comprises a status register and a control register and is used for the CPU 316 to monitor and control the serial/parallel converter 309.

The scrambler 311a enciphers the data and enables the enciphered data to be stored. The reason why the data is enciphered and stored is to protect the stored data. For example, assuming that only the portion of a flash memory 315 can be removed by some method, there is a fear that only the portion of the flash memory 315 is taken out by some person from malice, the contents in the flash memory 315 are read out, and the contents or personal information written there is stolen. When data is stored in the flash memory 315, if the data is enciphered, even if only the portion of the flash memory 315 was taken out and the contents were read out, the contents or personal information can be protected. An algorithm for encipherment by the scrambler 311a will be described in detail hereinlater.

An error detection code generating unit 311b adds an error detection code such as a CRC (Cyclic Redundancy Check) code or the like to the data to be transmitted or the data which is inputted and detects an error of the data to be transmitted or the data which is inputted. The reliability of the data is assured by performing such an error detection.

A page buffer 312 is used for temporarily storing a predetermined data capacity and temporarily storing data when the data is exchanged between the serial/parallel converter 309 and flash memory 315.

An RAM 313 is used for storing an arithmetic operation result, parameters, or the like which are temporarily generated when the CPU 316 processes the command inputted from the external apparatus.

A program to be processed by the CPU 316 has mainly been stored in the ROM 314. Processing commands comprise: the public command system which is necessary for manufacturing or using the cellular phones; the non-public command system for management for the purpose of security, for example, for operating the scramble key generating unit, data which cannot be used by persons other than an issuer or administrator; and the personal identification number. By preparing the non-public command system for management as mentioned above, a security function is further enhanced.

A program for operating files which can be seen from the outside, hidden files which cannot be accessed by systems other than the command system for management which is used only for management and for processes concerned with the encryption, and the like has been stored in the ROM 314.

A nonvolatile memory card comprising NAND type memory cells, for example, is used as a flash memory 315. Both of the files which can be seen and the files which cannot be from the outside are also stored in the flash memory 315 in accordance with a directory description or a file description, which will be explained hereinlater.

The CPU 316 reads out a necessary program from the ROM 314 and executes processes anytime in accordance with the command transferred from the external apparatus.

3-2. Session of an External Apparatus and the Smart Stick

How a host computer as an external apparatus controls the intelligent memory stick (smart stick) realized as mentioned above will now be described.

Figure 4:
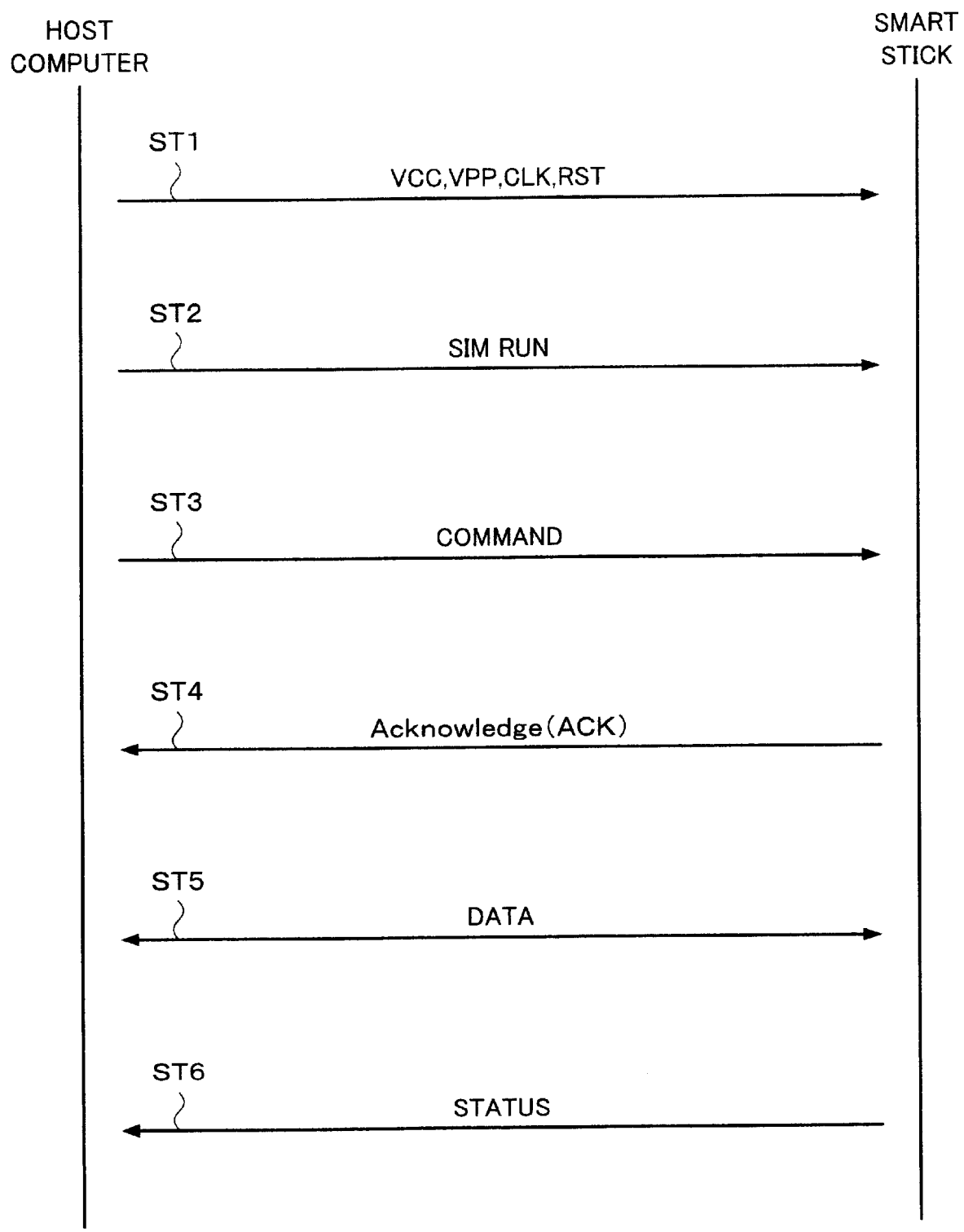
FIG. 4 is a schematic diagram for use in explanation of the example of the memory card to which the invention is applied.

FIG. 4 shows a session at the time when the external apparatus controls the foregoing smart stick. It is applied to the case of performing the control of the SIM in the conventional cellular phone of the GSM system.

First, the host computer supplies the power source Vcc, clock CLK, and reset signal RST in order to activate the smart stick (step ST1). The supplying order is set to the order of the power voltage Vcc, program power source Vpp (it is unnecessary in case of supplying the program power source in the smart stick; in case of supplying the program power source from the outside, it can be supplied simultaneously with the power source Vcc), clock CLK, and reset signal RST.

When the reset signal RST is changed from the "L" level to the "H" level, the smart stick enters the operative mode (step ST2). In the smart stick, an initialization adapted to receive commands from the host computer is performed.

Subsequently, the host computer sends an execution command to the smart stick (step ST3). For example, the execution command is constructed by several bytes and a code has been predetermined for the first byte every application field. Thus, the operation of the multifunction can be performed. The next byte indicates a processing command code. The subsequent byte comprises parameters or the like which are necessary when the command is executed.

When the smart stick receives the execution command from the host computer and can confirm the command, it returns an acknowledgment signal to the host computer (step ST4).

When the host computer subsequently sends the command and the acknowledgment signal is returned from the smart stick, the data can be transmitted and received between the host computer and the smart stick. The data is transferred from the host computer to the smart stick or from the smart stick to the host computer in accordance with the contents of the execution command (step ST5).

Finally, the smart stick sends a status word of 2 bytes to the host computer in order to notify the host computer of an end situation of the execution command (step ST6).

In the subsequent ordinary session, the operation in a range from the transmission of the execution command from the host computer to the smart stick (step ST3) to the transmission of the status word from the smart stick to the host computer (step ST6) is regarded as one access and the session is repeated.

3-3. About Encipherment

As shown in FIG. 3, in the smart stick to which the invention is applied, the data can be enciphered and stored in the flash memory 315. A generation of an enciphering key in this instance will now be described.

Figure 5:
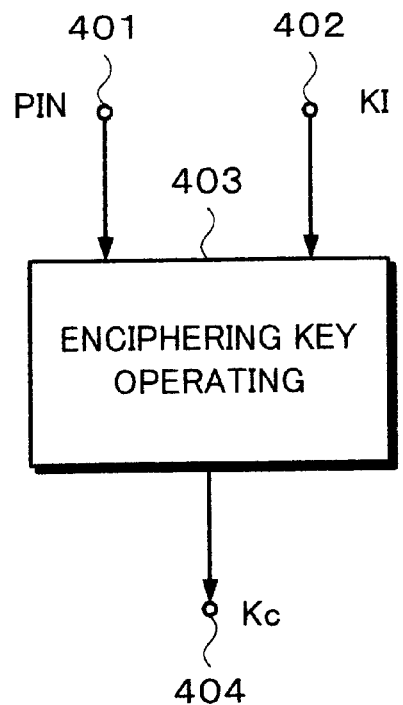
FIG. 5 is a block diagram for use in explanation of an encipherment in the example of the memory card to which the invention is applied.

FIG. 5 shows a process for generating the enciphering key. In FIG. 5, an enciphering key operating circuit 403 performs an arithmetic operation of an algorithm for generating an enciphering key from two parameters. The enciphering key operating circuit 403 is provided as hardware in the scrambler 311a in FIG. 3.

Two parameters are inputted to the enciphering key operating circuit 403 from input terminals 401 and 402. A personal identification number (PIN) of the user is used as one of the parameters. The parameter for forming the enciphering key is not limited to the PIN but, for example, a subscriber's number registered in a company at the time of issuing the card or a code which is used in a specific group can be also used.

Encipherment information Ki is used as another parameter. As mentioned above, as command systems of the smart stick, there are the public command system and the non-public command system and the non-public command system cannot be used by the persons other than the issuer or administrator. The encipherment information Ki has been preset so that it cannot be accessed unless the non-public command system is used.

The enciphering key operating circuit 403 forms the enciphering key by using the PIN of the user and the encipherment information Ki as parameters. An enciphering key Kc formed by the enciphering key operating circuit 403 is outputted from an output terminal 404.

Figure 6:
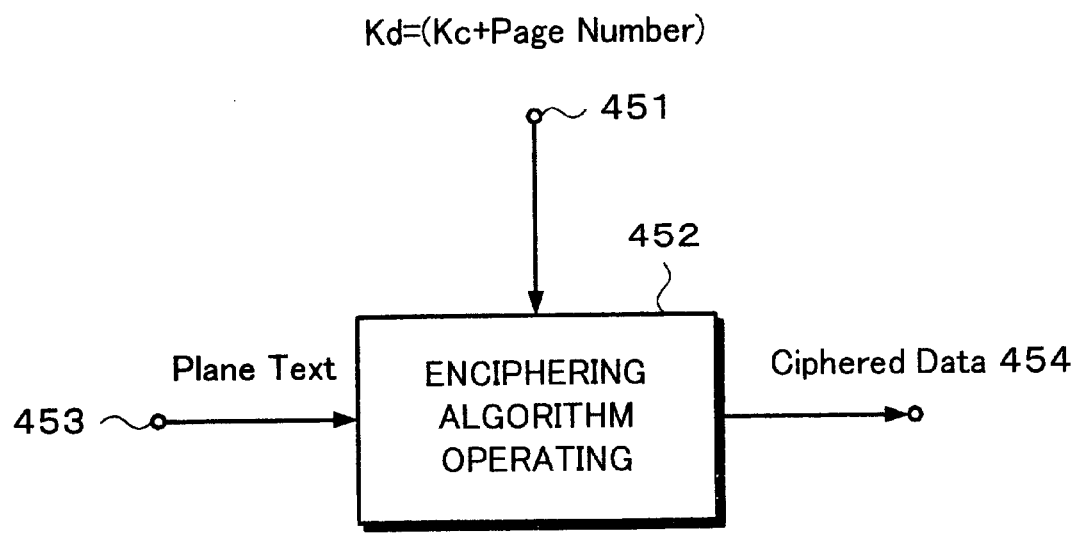
FIG. 6 is a block diagram for use in explanation of an encipherment in the example of the memory card to which the invention is applied.

An enciphering process is performed by an enciphering processing circuit as shown in FIG. 6 by using the enciphering key Kc formed as mentioned above.

In FIG. 6, an enciphering algorithm operating circuit 452 enciphers the input data by a predetermined enciphering algorithm and outputs the enciphered data. The enciphering algorithm operating circuit 452 is constructed in the scrambler 311a in FIG. 3 by hardware.

An enciphering key Kd is supplied from an input terminal 451 to the enciphering algorithm operating circuit 452. The enciphering key Kd is set to a value obtained by adding a variable parameter (page number at the time of accessing a page mode here) to the enciphering key Kc obtained as an operation result shown in the example of formation of the encipherment in FIG. 5.

The reason why the value obtained by adding a relative number from a certain reference to the formed enciphering key Kc is to enhance the security. When the enciphering key Kc is not changed, a possibility such that a scrambling algorithm is predicted by comparing the enciphered data with a plain sentence and the encipherment is deciphered remains, so that there is a possibility such that it becomes a problem on security.

Although the page number at the time of accessing the page mode is used here as a parameter which changes for the enciphering key Kc, any parameter can be used as such a variable parameter so long as the parameter at the time of input and that at the time of output coincide. For example, a relative value in which the first address where the data in an electrically rewritable nonvolatile memory or a flash memory is stored is used as a reference can be also used.

Data of the plain sentence (data before encipherment) is inputted from an input terminal 453 to the enciphering algorithm operating circuit 452. This data of the plain sentence denotes the data which was sent as serial data from the external apparatus and, thereafter, converted into the 8-bit parallel data by the serial/parallel converter 309. In the enciphering algorithm operating circuit 452, this input data is enciphered by using the enciphering key Kd (enciphering key Kc+page number) from an input terminal 451.

The data enciphered by the enciphering algorithm operating circuit 452 is outputted from an output terminal 454. The enciphered data is stored in the flash memory 315 (FIG. 3).

As mentioned above, the data of the plain sentence and the enciphering key (enciphering key Kc+page number) are supplied to the enciphering algorithm operating circuit 452 constructed by the hardware in the scrambler 311a (FIG. 3). The enciphered data is formed by the enciphering algorithm operating circuit 452 in accordance with a predetermined enciphering algorithm. The enciphered data is outputted from the output terminal 454 and finally stored in the flash memory 315 (FIG. 3).

The processes in the case where the data of the plain sentence inputted from the external apparatus is enciphered and stored in the flash memory 315 have been described in the above example. However, it is sufficient that the processes in the case where the data stored in the flash memory 315 is read out, the enciphered data is deciphered to the data of the plain sentence, and the deciphered data is outputted to the external apparatus are executed by a procedure opposite to the foregoing procedure.

In case of storing the data into the flash memory 315, it is not always necessary to encipher the data. It is also possible to store the plain sentence data as it is into the flash memory 315 without enciphering the data and output it by a plain sentence from the flash memory 315 as necessary. On the contrary, it is also possible to encipher the data and store the enciphered data into the flash memory 315 and output the enciphered data to the external apparatus without deciphering it from the flash memory 315 in which the enciphered data has been stored.

3-4. About a File Construction

A construction of directories and files which are developed on the flash memory 315 will now be described. A system for such a file development is obtained by improving a file management system of the SIM used for the cellular phones of the GSM system.

FIGS. 7A to 7E show specifications of the directories. A description of the directories provides information of main directories and sub-directories constructed under the main directory. A description of the main directories and a description of the sub-directories are similar.

In the case where the smart stick to which the invention has been applied is used by the multifunction, for example, it is presumed to separately use the main directories by dividing them into a main directory for communication, a main directory for electronic publishing, a main directory for downloading a game, a directory which can be freely used by the final user, and the like. In such a case, since the setting conditions of the security are different in dependence on their objects, each of those directories has management information.

FIG. 7 shows a description of the directories. Information indicating whether a capacity of the main directories or sub-directories, the number of files, and a personal identification number function for security are provided or not, whether the clock generation can be stopped or not, and the like is included in the description of the directories. This information can be read out from the external apparatus and the directories other than the hidden directories for management are also used to control the memory stick.

The description of the directories is mainly classified into common specifications (FIG. 7A) and specifications (FIG. 7B) for each application.

First, the common specifications shown in FIG. 7A will be described. In the common specifications, information is coded in a format that is common to all of the applications. Bytes B1 to B4 of the common specifications indicate a residual non-use memory capacity and show a remaining memory capacity which can be used for the whole smart stick.

Bytes B5 to B20 indicate a directory ID and a tag. A code of two bytes and the remaining bytes are used as, for example, a plain sentence title or the like of ASCII. Although the directory ID and tag are set to 16 bytes as an example, the more number of bytes can be also allocated here.

Byte B21 indicates a directory type and the data for identifying the directory or file is coded. FIG. 7C shows an example of a coding of Byte B21. For example, in case of using the card by the multifunction, the main directory of each application is coded to "01" (h denotes a hexadecimal notation) and the sub-directories under the main directory are coded to "02h". The sub-directories are coded to "04h" in case of showing a data file.

Bytes B22 to B27 indicate a time stamp. The time stamp is information which is not used for the SIM in the cellular phones of the GSM system. For example, in the case where a directory is newly formed in a floppy disk, a hard disk, or the like, a time stamp is certainly made to enter into an agreement. The time stamp is provided on the assumption of it. The time stamp can be also used for sales or electronic publishing of software whose use is permitted by the issuer with a time limit. For example, it is also possible to make a rule in such a manner that the contents cannot be read out if the term was switched with reference to the time stamp. Although the time stamp of up to a minute unit has been written as an example here, it can be also written on a second unit basis.

Bytes B28 to B29 are reserved in consideration of the future expansion.

Byte B30 denotes a data length of a subsequent file for application and is used for showing to which position as a size of the specifications for each application the directory description is shown. The sub-directory description and the data file continue after Byte B30, thereby enabling the application to be performed and enabling the memory to be effectively used.

The specifications of each application shown in FIG. 7B will now be described. In FIG. 7B, Byte B31 indicates directory characteristics. FIG. 7D shows an example of coding. For instance, information showing whether the generation of the operating clock for the CPU which is supplied to the smart stick can be stopped or not and information indicating whether the clock generation is stopped or not when the state showing the case where it can be stopped is at the "H" level or the "L" level are coded. There is also a case where an electric current consumption is changed in dependence on the state at the time when it is stopped. In the cellular phones or the like, a device for minimizing it as much as possible is made.

Bit 8 of the directory characteristics indicates whether PIN1 is valid or invalid. A personal identification number to confirm the validity of the user mainly is set into PIN1 and the above state can be easily checked.

Bytes B32 and B33 indicate the number of sub-directories. For example, in the case where the card is used by multifunction, the number of sub-directories existing under the main directory which is set every application is coded.

Bytes B34 and B35 indicate the number of files. For example, in the case where the card is used by multifunction, the number of files existing under the main directory and sub-directories which are set every application is coded.

Byte B36 indicates a PIN, an unblocking PIN, or the number of administrative codes, namely, the personal identification number (PIN), the unblocking number in the case where the PIN has been blocked, or the number of special codes for management which have been set are shown. For example, assuming that two kinds of PINs have been set and, further, two kinds of administrative codes for the administrator which are not published and cannot be used have been set, Byte B36 is coded to a value of "4(h)".

Byte B37 is reserved for the future expansion.

Byte B38 denotes a PIN1 status. FIG. 7E shows a coding of a security status. For example, if PIN1 has been set, Bit 8 is coded to "1". Further, if a continuous misinput counter has been set to "3", it is coded to "83(h)". In this case, if the personal identification number of PIN1 was continuously and erroneously inputted, the PIN misinput counter is set to "0", so that the user cannot perform the verification of PIN1 any more. This state is called a state where the PIN1 has been blocked. If the verification of the PIN1 was correctly performed the value of the PIN misinput counter is reset to an initial value "3".

Byte B39 indicates an unblocking PIN1 status. FIG. 7E shows the coding of the security status. For example, if PIN1 has been set, Bit 8 of the unblocking PIN1 status which forms a pair together with the PIN1 is coded to "1". If the misinput counter of the PIN1 status is equal to "0" and the PIN1 has been blocked, a personal identification number PUK (Unblocking Personal Key) is separately prepared to unblock the blocked PIN1. The unblocking PIN1 status shows such a state.

For example, when the continuous misinput counter has been set to "10", the unblocking PIN1 status is also coded to "8A(h)". In this case, if the personal identification number PUK1 is erroneously and continuously inputted ten times, the continuous misinput counter is set to "0" and the user cannot perform the verification of the personal identification number PUK1 for unblocking the PIN1 any more. In this state, there is only means such that the issuer or administrator reconstructs by using the management command system used. Such a point also contributes to enhance the security. If the verification of the personal identification number PUK1 for unblocking the PIN1 was correctly performed, the value of the PUK1 misinput counter is reset to the initial value "10" and the user newly sets PIN1.

Byte B40 shows a PIN2 status. Byte B41 indicates an unblocking PIN2 status. The PIN2 status and the unblocking PIN2 status are similar to the PIN1 status and the unblocking PIN1 status.

Bytes B42 to B48 indicate an administrative management use and is used, for example, in case of using a command system which is not opened to the manufacturers of the cellular phones or the like.

The file description described by information for directly managing the activation or the like of the data file will now be explained.

FIGS. 8A to 8G show a file description. The file description can be classified into common specifications (FIG. 8A) and specifications (FIG. 8B) for each application.

FIG. 8A shows the common specifications. In FIG. 8A, bytes B1 to B4 show a file size.

Bytes B5 to B20 indicate a file ID and a tag. A code of two bytes and the remaining bytes are used as, for example, a plain sentence title or the like of ASCII. Although the file ID and tag are set to 16 bytes as an example, the larger number of bytes can be also allocated here.

Byte B21 indicates a file type. FIG. 8C shows an example of a coding. In case of a data file, Byte B21 is coded to "04(h)".

Bytes B22 to B27 indicate a time stamp. The time stamp is information which is not used for the SIM in the cellular phones of the GSM system. For example, in the case where a directory is newly formed in a floppy disk, a hard disk, or the like, a time stamp is certainly made to enter into an agreement. The time stamp is provided on the assumption of it. The time stamp can be also used for sales or electronic publishing of software whose use is permitted by the issuer with a time limit. For example, it is also possible to make a rule in such a manner that the contents cannot be read out with reference to the time stamp if the term was switched. Although the time stamp of up to a minute unit has been written as an example here, it can be also written on a second unit basis.

Byte B28 shows a mode. FIG. 8D shows an example of a coding. For example, it denotes a file having a file structure in which a unit such as charging information or the like can be increased every predetermined time by one command and shows whether this command can be executed or not. For example, it can be used for managing in such a manner that if the count value is counted up to a state where the charging information cannot be increased any more, this smart stick cannot be used, or the like.

Bytes B29 to B32 indicate access conditions. FIG. 8E shows an example of coding. When the corresponding command is executed every byte, security conditions which need to be satisfied are set.

Byte B32 denotes access conditions of the smart stick. FIG. 8F shows an example of coding. Bit 1 to Bit 4 of Byte B32 denote conditions which have to be satisfied when the scrambling is used. Bit 5 to Bit 8 denote conditions which have to be satisfied when the access concerned with the copy is performed. Their codings are shown by the access conditions.

When the access condition code is equal to "0(h)", it is always possible to access. When it is equal to "1(h)", the access is possible in the case where the verification of PIN1 has normally been finished. When it is equal to "2(h)", the access is possible in the case where the verification of PIN2 has normally been finished. "3(h)" is reserved for the future expansion. "4(h)" denotes that the smart stick can be used when the non-public access conditions for management are satisfied. F(h) indicates that the access is impossible. For example, if Byte B32 has been coded to "01(h)", the scrambling can be used in the case where the verification of PIN1 was normally finished, and the copying operation can be freely performed.

Byte B33 denotes a file status and shows a state of this file. FIG. 8G shows an example of coding. For example, Bit 1 indicates whether this file can be used or not. Bit 2 shows whether the recorded data has been scrambled or not.

Byte B34 denotes a subsequent file data length for an application and is used to show a degree of occupation of the directory description in it in a size of the specifications for each application. The sub-directory description and the data file continue after Byte B34, thereby enabling the memory to be effectively used.

The specifications of each application will now be described. FIG. 8B shows the specifications for each application. In FIG. 8B, Byte B35 indicates a structure of a data file and shows a logical structure of the file.

When the structure of the data file is coded to "00(h)", the data of a certain capacity is stored as it is in a manner similar to the case of the ordinary memory. When it is coded to "01(h)", the data of a certain predetermined format is grouped and stored. For example, assuming that data of one of the abbreviation dials consists of 50 bytes, the data of one dial is called a record and handled in a lump. For example, a memory of 5 kbytes is assured as 100 records. When the structure of data file is coded to "03(h)", although the records have a format of the same records as those of linear fix of "02(h)", the order of the records can be sequentially exchanged. For instance, the priority of the record is changed and this record can be set to the first record. That is, assuming that the records starting from the first record, the second record, . . . , and ending to the nth record are received, there is a method whereby the order of the records is exchanged, the first record is set to the nth record, and the second record is newly set to the first record.

Bytes B36 and B37 show a length of record and indicates a memory size of one record. How many records can be used can be calculated from the file size and the length of record.

3-5. About an Access Process

An accessing process of the smart stick to which the invention is applied will now be described hereinbelow with respect to several command processes as examples with reference to flowcharts.

Figure 9:
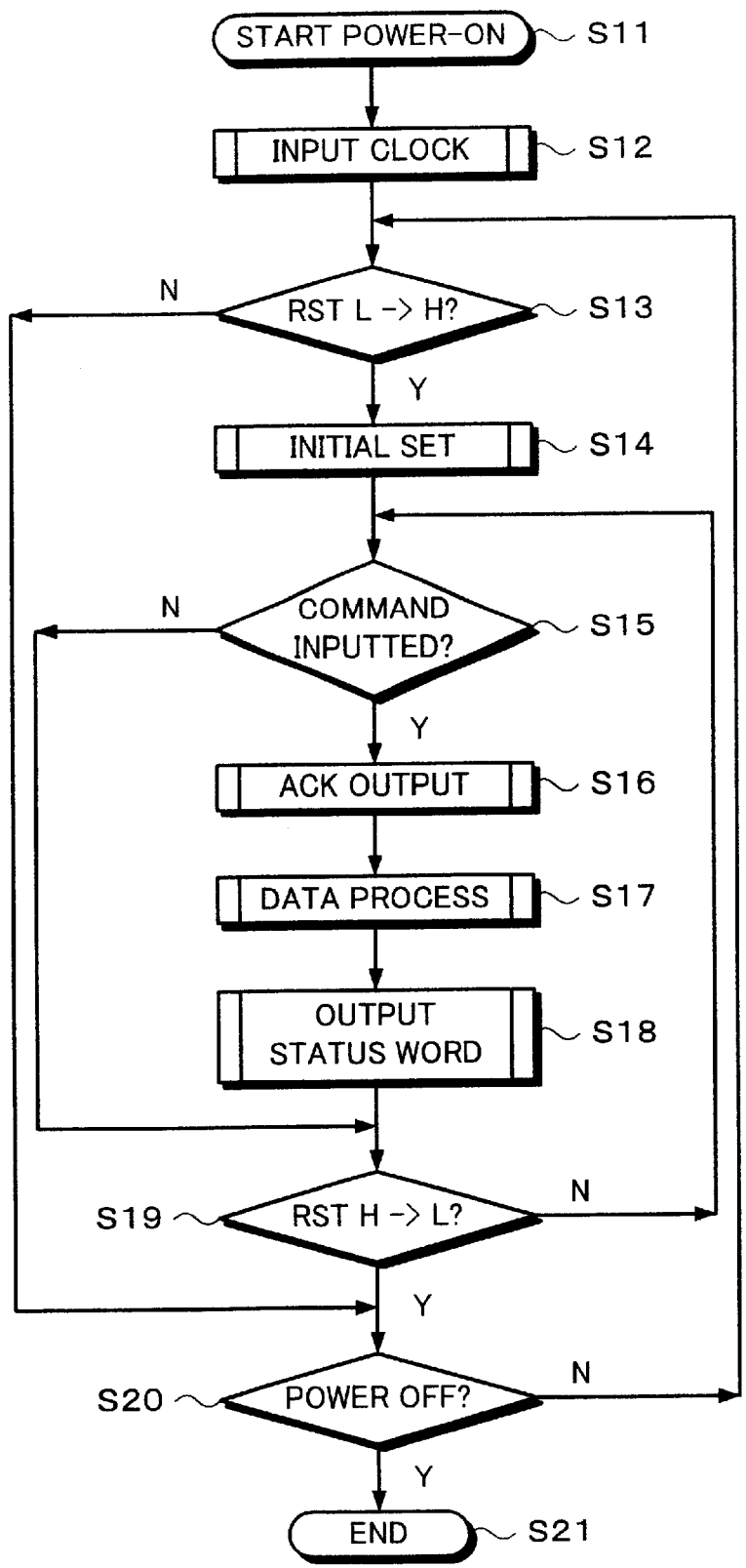
FIG. 9 is a flowchart for use in explanation of the example of the memory card to which the invention is applied.

FIG. 9 shows the basic operation of the smart stick to which the invention is applied. In FIG. 9, a power source is supplied from the external apparatus when the power of the smart stick is turned on. At this time, the program power source Vpp of the flash memory is simultaneously supplied as necessary (step S11).

Subsequently, the operating clock of the CPU is supplied from the external apparatus (step S12). After that, whether the reset signal is changed from the "L" level to the "H" level and the CPU enters the operative mode or not is discriminated (step S13).

When the external apparatus does not activate the smart stick, the reset signal is not changed from the "L" level to the "H" level. At this time, the processing routine advances to the power-off discrimination (step S20).

When the external apparatus has activated the smart stick, the reset signal is changed from the "L" level to the "H" level. In this instance, the processing routine advances to the initial setting (step S14), thereby preparing for the command reception from the external apparatus and the data exchange.

Whether the command has been inputted from the external apparatus in a command waiting state or not is discriminated (step S15). If the command is not inputted, the reset signal RST is checked (step S19).

If the command has been inputted in step S15, a process for outputting the acknowledgement signal is performed to notify the external apparatus of the fact that the command was received (step S16). Subsequently, a data process of the outputting process or inputting process of the data is performed as a process for responding to the command (step S17). A status word is outputted to notify the external apparatus of an end situation of the process (step 18).

When the status word is outputted, the reset signal is discriminated (step S19). If the reset signal RST is at the "H" level, whether the power source has been turned off or not is discriminated to receive the command again (step S20).

If the power source is not turned off, the reset signal is checked again (step S13). If the power source is OFF, all of the functions are stopped and the processing routine is finished (step S21).

A process of the personal identification number concerned with the security will now be described with reference to a flowchart of FIG. 10.

Since the processes for handling the PIN1, PIN2, PUK1, and PUK2 described in the directory description are similar to those mentioned above except for a point that only the number of misinputs differs, they will be explained in a lump.

Figure 10:
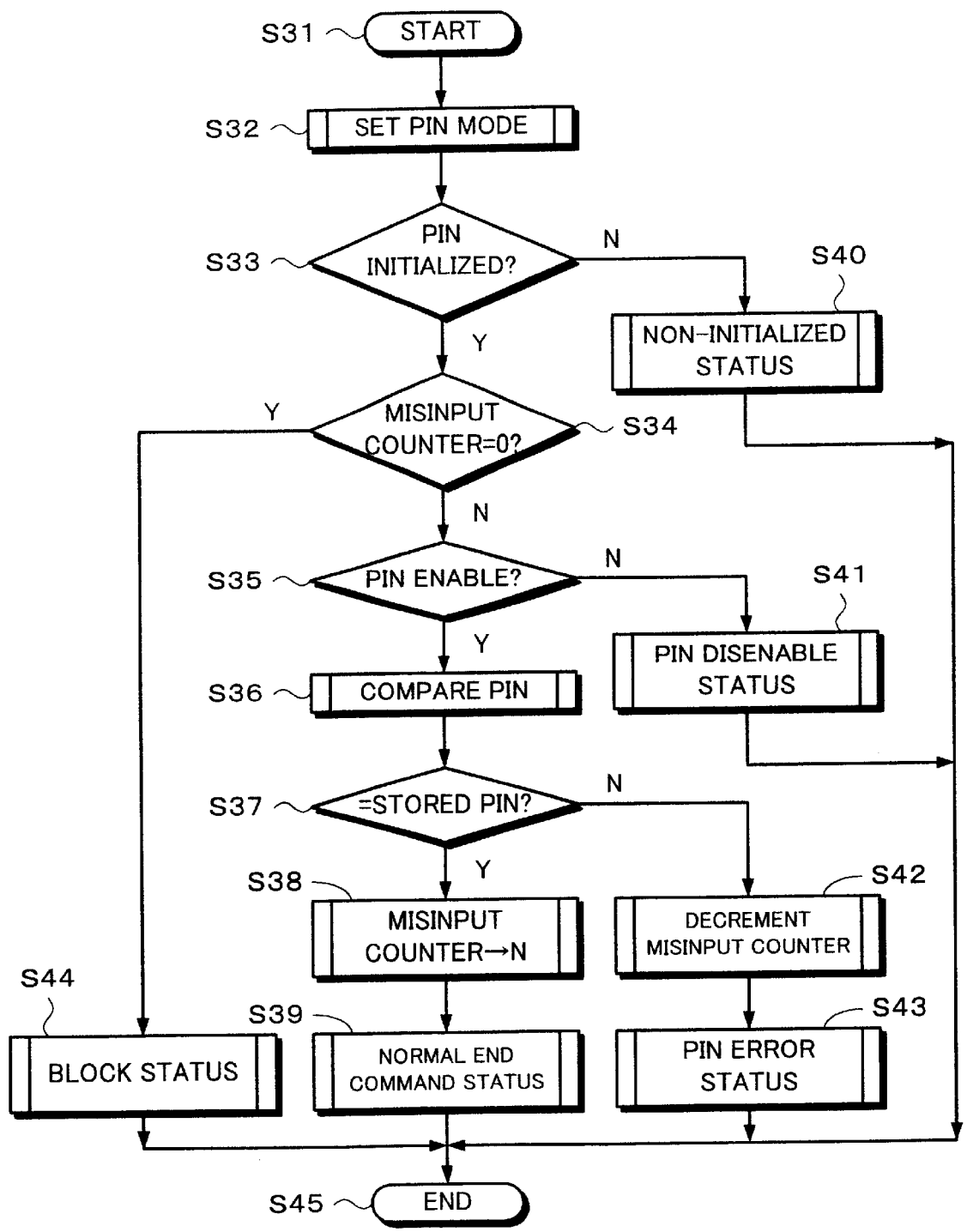
FIG. 10 is a flowchart for use in explanation of the example of the memory card to which the invention is applied.

In FIG. 10, the processing routine is started from step S31 when the PIN is inputted.

Subsequently, a PIN mode for setting one of the PIN1, PIN2, PUK1, and PUK2 is set (step S32). Whether the subject PIN has been initialized in accordance with the set mode is discriminated or not (step S33).

When the PIN is not initialized, a status showing that it is not initialized is outputted to the external apparatus (step S40) by a status word outputting process (step S18) in the main routine in the flowchart of FIG. 9. The processing routine is finished (step S45).

If the PIN has been initialized, whether a value of the misinput counter is equal to "0" or not is discriminated to check whether the PIN has been blocked or not. If the value of the misinput counter is equal to "0", the status showing that the PIN has been blocked is outputted to the external apparatus (step S44).

If the value of the misinput counter is not equal to "0", since the subject PIN is not blocked, a PIN enable discriminating process for checking the necessity about the function to verify the subject PIN is executed (step S35). If the verifying function of the subject PIN is set to be unnecessary, a status showing that the PIN is disenable is outputted to the external apparatus (step S41).

If the verifying function of the subject PIN is necessary, the contents of the subject PIN which have previously been stored are compared with the inputted PIN (step S36).

Whether the pre-stored PIN and the inputted PIN coincide or not is discriminated (step S37). If the inputted PIN is wrong, a process to decrease the count value of the misinput counter is performed in order to update it (step S42). A status showing that the PIN is wrong is outputted to notify the external apparatus of the fact that the wrong PIN was inputted (step S43). The processing routine is finished (step S45).

When the pre-stored PIN and the inputted PIN coincide, the misinput counter is initialized and the misinput counter of the concerned PIN is also initialized (step S38). A status indicative of a normal end command is outputted (step S39). The processing routine is finished (step S45).

A file accessing process will be described as an example with respect to a file updating process. The processes for the other commands are also similarly executed.

Figure 11:
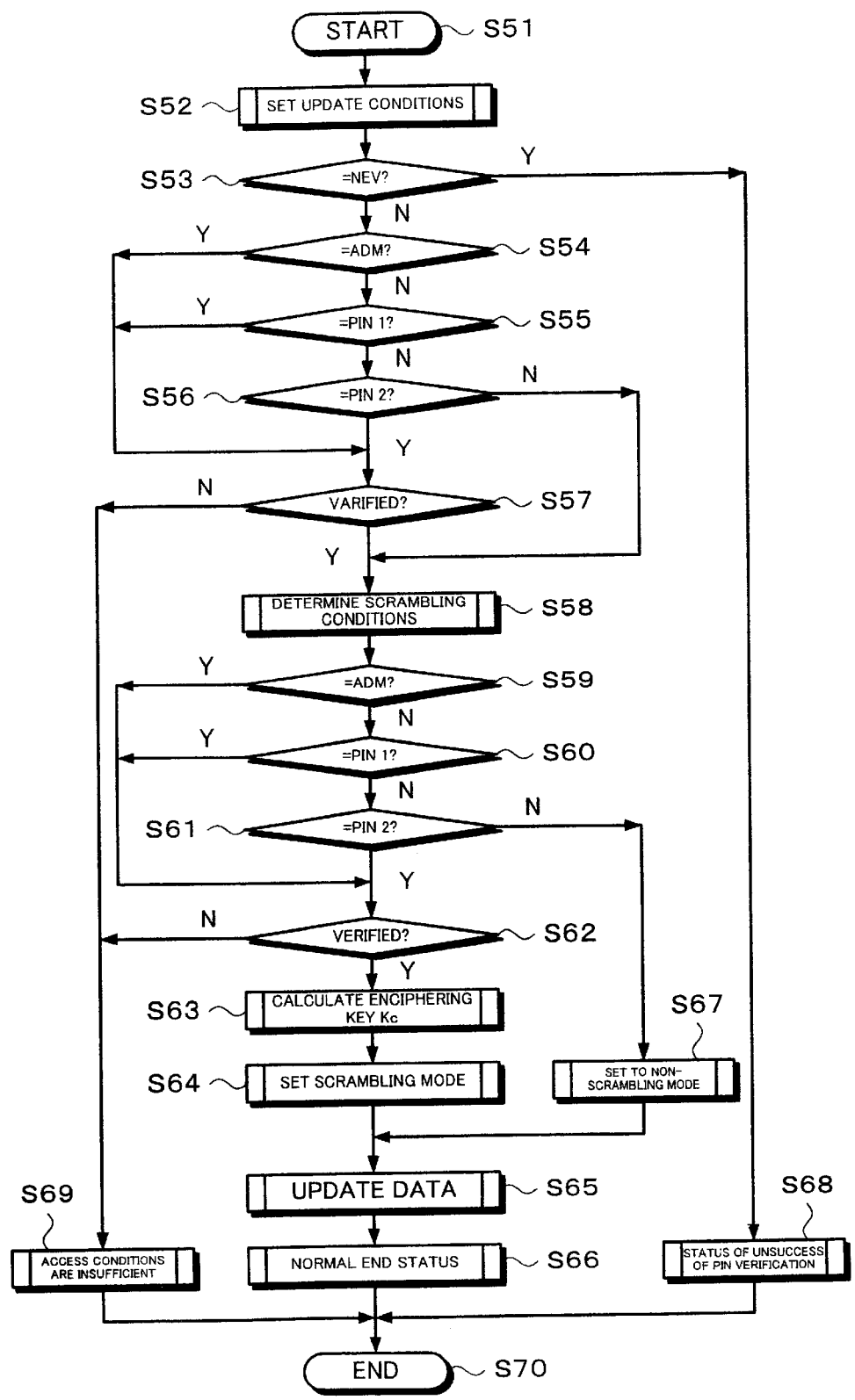
FIG. 11 is a flowchart for use in explanation of the example of the memory card to which the invention is applied.

FIG. 11 shows a flowchart for file updating. First, an updating command is inputted from the external apparatus and the processing routine is activated (step S51).

The CPU subsequently sets updating conditions in order to refer to Bit 1 to Bit 4 (refer to FIG. 8F) of Byte B29 in which the updating conditions have been coded in the file description (FIGS. 8A to 8G) (step S52). Subsequently, the subject access condition code in the file description is sequentially checked.

Whether the access of the file has been inhibited or not is first discriminated (step S53). If the access has been inhibited, a status showing that the accessing conditions are not satisfied and notifying the external apparatus of the fact that the conditions are inadequate is outputted to the external apparatus (step S69).

If the access is not inhibited in step S53, whether it corresponds to the verification of the code on management or not is discriminated (step S54). If YES, a verification is executed (step S57).

If it does not correspond to the code on management, whether it corresponds to the verification on the PIN1 or not is discriminated (step S55). If YES, a verification is executed (step S57).

If NO, since it corresponds to a verification unnecessary code (ALW) of the access condition code in the file description shown in FIGS. 8A to 8G, step S58 follows and the scrambling conditions are discriminated and set.

If YES as a result of discrimination in one of steps S54, S55, and S56, whether the verification of the subject PIN or code has been finished or not is discriminated (step S57).

If the verification of the subject PIN or code is not finished yet, a status showing that the verification of the PIN is not finished is outputted to the external apparatus (step S68).

Subsequently, the subject access condition code in the file description shown in FIGS. 8A to 8G is sequentially checked.

Whether it corresponds to the code verification on management or not is first discriminated (step S59). If it does not correspond to the code on management, whether it corresponds to the verification in the PIN1 or not is discriminated (step S60). If NO, whether it corresponds to the verification in the PIN2 or not is discriminated (step S61). If NO, since it corresponds to a non-use code (NEV) of the access conditions in the file description, a mode in which the scrambling is not used is set and the process is executed (step S67).

If YES in one of steps S59, S60, and S61, whether the verification of the subject PIN or code has been finished or not is discriminated (step S62). If NO, a status showing that the verification of the PIN is unsuccessful is outputted to the external apparatus (step S68).

If it is determined in step S62 that the verification has been finished, a process for calculating the enciphering key is executed in order to refer to the enciphering key Kc (step S63). The device is set to a scrambling mode so as to encipher by the compound enciphering key (Kc+page number) by using the enciphering key Kc obtained here (step S64). In this instance, for example, the page number constructing a part of the compound enciphering key can be directly inputted from hardware.

After whether the scrambling is used or not was selected before as mentioned above, the updating of the data is actually executed (step S65). At a point when the updating of all of the data has been completed, a status to notify the external apparatus of the normal end of the processes is outputted (step S66). The processing routine is finished (step S70).

4. Another Example of an Intelligent Memory Stick

Figure 12:
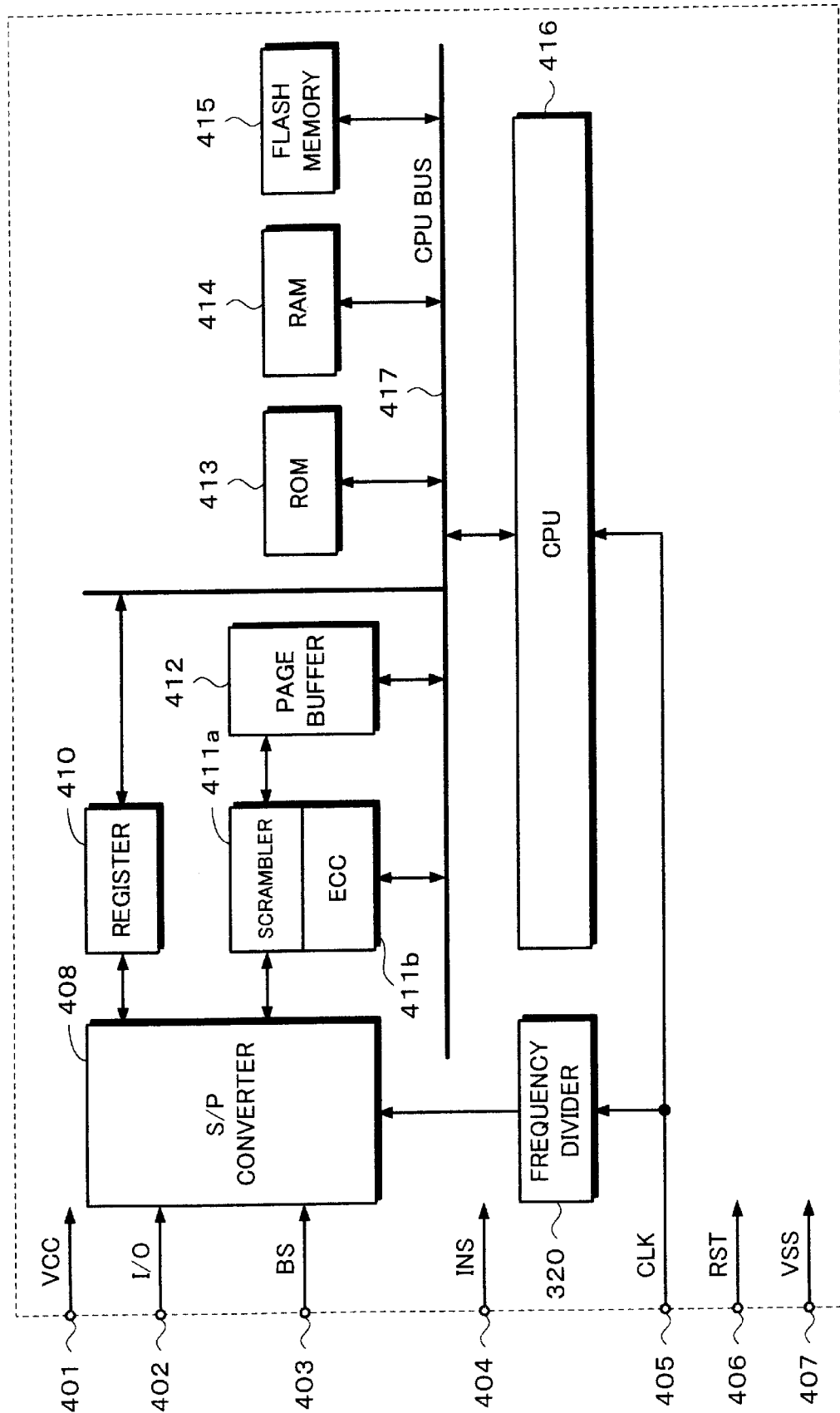
FIG. 12 is a block diagram in another example of a memory card to which the invention is applied.

Another example of a smart stick to which the invention is applied will now be described. FIG. 12 shows an internal structure of another example of a smart stick to which the invention is applied.

In the smart stick shown in FIG. 3, the transfer clock SCLK to the serial/parallel converter 309 is supplied from the clock input terminal 304. In another example, however, the operating clock of the CPU is frequency divided by a frequency divider 320 to thereby obtain the transfer clock SCLK. The other construction is similar to that in the example shown in FIG. 3 mentioned above.

By forming the transfer clock SCLK by frequency dividing the operating clock CLK as mentioned above, one of the signal lines regarding the clock becomes unnecessary and the operation can be performed by a single clock. Thus, a burden on the external apparatus is reduced.

In the example, since the relation between the transfer clock SCLK and the operating clock CLK is determined by a frequency dividing ratio of the frequency divider 320, frequencies of the transfer clock SCLK and operating clock CLK cannot be arbitrarily determined. The transfer clock SCLK and the operating clock CLK cannot be independently stopped.

This is nothing but the operation corresponding to the half duplex asynchronous communication protocol specified in ISO7816 and does not particularly becomes a negative factor. Rather, a possibility as a substitution for the SIM specified by the GSM or the like increases.

In this example, in the case where the CPU is not performing the process, the operating clock can be stopped by a proper procedure. In the cellular phones, the function to stop the operating clock or transfer clock can be regarded to be effective means because it is indispensable to reduce an electric power consumption from a viewpoint that the cellular phone is driven by a battery.

Since the smart stick to which the invention is applied has therein the CPU, it can be applied not only to a field for storage of the contents data but also to various fields. For example, it can be used not only as an external storage but also a coprocessor of a personal computer.

According to the invention, the CPU and the enciphering circuit are provided for the memory card with the construction of the memory stick. The data which is inputted and outputted is enciphered and stored in the flash memory. The command system for accessing the memory stick has the public command system and the non-public command system. In the file data which is stored in the flash memory, the access restriction, copy guard information, and the encipherment and the personal identification number at the time of access can be selectively set every file data. The processes of those file data are managed by the data files including the hidden data files. The access right is set to the file data and the accesses for reading and writing the file data are restricted by the access right. Since the data is enciphered and stored in the flash memory as mentioned above, the security of the data to be stored is enhanced.

The present invention is not limited to the foregoing embodiments but many modifications and variations are possible within the spirit and scope of the appended claims of the invention.

What is claimed is:

1. A card-shaped semiconductor storage device comprising:

a nonvolatile semiconductor memory;

data input/output control means for performing input/output control of data to/from said nonvolatile semiconductor memory;

interface means for providing an interface with an external apparatus;

enciphering means for enciphering the data to be stored in said nonvolatile semiconductor memory; and control means for controlling encipherment by said enciphering means.

2. The storage device according to claim 1, further comprising a command system for accessing said nonvolatile semiconductor memory and having a public command system and a non-public command system for management.

3. The storage device according to claim 1, wherein the data in said nonvolatile semiconductor memory comprises file data and includes hidden file data.

4. The storage device according to claim 1, wherein the data stored in said nonvolatile semiconductor memory comprises file data, and wherein access restriction, copy guard information, encipherment, and a personal identification number at the time of access can be selectively set for every file data.

5. The storage device according to claim 4, wherein in said file data stored in said nonvolatile semiconductor memory, a data file including hidden data file manages processes.

6. The storage device according to claim 1, wherein an access right is set into file data stored in said nonvolatile semiconductor memory, and accesses for reading and writing said file data are restricted in accordance with said access right.

7. The storage device according to claim 6, wherein a restriction of said access right can be set by a personal identification number of a user.

8. The storage device according to claim 1, wherein an operating clock of said control means and a transfer clock used for input/output of the data can be independently changed.

9. The storage device according to claim 1, wherein an operating clock of said control means is frequency divided and used as a transfer clock for input/output of the data.

10. The storage device according to claim 1, wherein said enciphering means generates an enciphering key based on parameters of personal information of a user.

11. The storage device according to claim 1, wherein said enciphering means generates an enciphering key based on a personal identification number of a user.

12. The storage device according to claim 1, wherein said enciphering means generates an enciphering key based on a subscriber's number.

13. The storage device according to claim 2, wherein said enciphering means generates an enciphering key based on parameters of personal information and parameters accessed by said non-public command system for management.

14. The storage device according to claim 1, wherein said enciphering means performs enciphering using a compound value of an enciphering key formed by an enciphering algorithm and a variable value.

15. The storage device according to claim 14, wherein said variable value is a page number at a time when a page mode is accessed.

16. The storage device according to claim 1, wherein input data is enciphered and stored in said nonvolatile semiconductor memory and the data read out from said nonvolatile semiconductor memory is deciphered prior to output.

17. The storage device according to claim 1, further comprising means for setting either a first mode in which input data is enciphered and stored in said nonvolatile semiconductor memory and the data read out from said nonvolatile semiconductor memory is deciphered and outputted or a second mode in which the input data is stored as is in said nonvolatile semiconductor memory and the data read out from said nonvolatile semiconductor memory is outputted as is.

18. The storage device according to claim 1, further comprising means for setting:
a first mode in which input data is enciphered and stored in said nonvolatile semiconductor memory and data read out from said nonvolatile semiconductor memory is deciphered and outputted; and
a second mode in which the input data is enciphered and stored in said nonvolatile semiconductor memory and the enciphered data read out from said nonvolatile semiconductor memory is outputted without enciphering.

19. The storage device according to claim 1, further comprising means for setting:
a first mode in which input data is enciphered and stored in said nonvolatile semiconductor memory and the data read out from said nonvolatile semiconductor memory is deciphered and outputted;
a second mode in which the input data is stored as is in said nonvolatile semiconductor memory and the data read out from said nonvolatile semiconductor memory is outputted as is; and
a third mode in which the input data is enciphered and stored in said nonvolatile semiconductor memory and the enciphered data read out from said nonvolatile semiconductor memory is outputted.

20. An operation setting method of a card-shaped semiconductor storage device having a memory card constructed by a nonvolatile semiconductor memory, a data input/output control unit for performing an input/output control of data to/from said nonvolatile semiconductor memory, and an interface for interfacing with an external apparatus,
wherein said method comprises the steps of:
enciphering the data; and
storing said enciphered data into said nonvolatile semiconductor memory.

21. The method according to claim 20, further comprising the step of providing a command system for accessing said nonvolatile semiconductor memory, wherein said command system has a public command system and a non-public command system for management.

22. The method according to claim 20, comprising the further step of storing file data in said nonvolatile semiconductor memory, wherein said file data includes hidden file data.

23. The method according to claim 20, comprising the further step of storing file data in said nonvolatile semiconductor memory, wherein an access restriction, copy guard information, and encipherment and a personal identification number at a time of access can be selectively set for every file data.

24. The method according to claim 23, wherein in said file data stored in said nonvolatile semiconductor memory, a data file including hidden data file manages processes.

25. The method according to claim 20, further comprising the steps of setting an access right into file data stored in said nonvolatile semiconductor memory, and restricting accesses for reading and writing said file data in accordance with said access right.

26. The method according to claim 25, wherein a restriction of said access right is set by a personal identification number of a user.

27. The method according to claim 20, further comprising the step of independently changing an operating clock of said semiconductor storage device and a transfer clock used for the data input/output.

28. The method according to claim 20, wherein an operating clock of said semiconductor storage device is frequency divided and used as a transfer clock for the data input/output.

29. The method according to claim 20, wherein in said step of enciphering an enciphering key is generated based on parameters of personal information.

30. The method according to claim 20, wherein in said step of enciphering an enciphering key is generated based on a personal identification number of a user.

31. The method according to claim 20, wherein in said step of enciphering an enciphering key is generated based on a subscriber's number.

32. The method according to claim 21, wherein in said step of enciphering an enciphering key is generated based on parameters of personal information and parameters accessed by said non-public command system for management.

33. The method according to claim 20, wherein in said step of enciphering forming an enciphering key as a compound value formed by an enciphering algorithm and a variable value.

34. The method according to claim 33, wherein said variable value is a page number at a time when a page mode is accessed.

35. The method according to claim 20, wherein input data is enciphered and stored in said nonvolatile semiconductor memory and the data read out from said nonvolatile semiconductor memory is deciphered and outputted.

36. The method according to claim 20, further comprising the step of setting either a first mode in which input data is enciphered and stored in said nonvolatile semiconductor memory and the data read out from said nonvolatile semiconductor memory is deciphered and outputted or a second mode in which the input data is stored as it is in said nonvolatile semiconductor memory and the data read out from said nonvolatile semiconductor memory is outputted as it is.

37. The method according to claim 20, further comprising the step of setting:

a first mode in which input data is enciphered and stored in said nonvolatile semiconductor memory and data read out from said nonvolatile semiconductor memory is deciphered and outputted; and a second mode in which the input data is enciphered and stored in said nonvolatile semiconductor memory and the enciphered data read out from said nonvolatile semiconductor memory is outputted.

38. The method according to claim 20, further comprising the step of setting:

a first mode in which input data is enciphered and stored in said nonvolatile semiconductor memory and the data read out from said nonvolatile semiconductor memory is deciphered and outputted;

a second mode in which the input data is stored as is in said nonvolatile semiconductor memory and the data read out from said nonvolatile semiconductor memory is outputted as it is; and a third mode in which the input data is enciphered and stored in said nonvolatile semiconductor memory and the enciphered data read out from said nonvolatile semiconductor memory is outputted.

* * * * *